(12) United States Patent
Liu

(10) Patent No.: US 11,567,544 B2
(45) Date of Patent: Jan. 31, 2023

(54) ROTATING MODULE AND ELECTRONIC DEVICE

(71) Applicant: BEIJING XIAOMI MOBILE SOFTWARE CO., LTD., Beijing (CN)

(72) Inventor: Jianwei Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 36 days.

(21) Appl. No.: 17/383,428

(22) Filed: Jul. 22, 2021

(65) Prior Publication Data

US 2022/0308640 A1 Sep. 29, 2022

(30) Foreign Application Priority Data

Mar. 24, 2021 (CN) .......................... 202110312894.8

(51) Int. Cl.
| | |
|---|---|
| *G06F 1/16* | (2006.01) |
| *F16C 11/04* | (2006.01) |
| *E05D 1/04* | (2006.01) |
| *E05D 11/08* | (2006.01) |

(52) U.S. Cl.
CPC ............ *G06F 1/1681* (2013.01); *F16C 11/04* (2013.01); *E05D 1/04* (2013.01); *E05D 11/08* (2013.01); *E05Y 2900/606* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,464,395 B2* | 6/2013 | Huang | .................. | G06F 1/1681 16/342 |
| 9,423,837 B2* | 8/2016 | Huang | .................. | G06F 1/1681 |
| 9,429,987 B2* | 8/2016 | Yang | .................. | G06F 1/1681 |
| 9,645,606 B2* | 5/2017 | Tong | .................. | F16F 9/12 |
| 10,309,137 B2* | 6/2019 | Wu | .................. | F16C 11/04 |
| 10,831,242 B1* | 11/2020 | He | .................. | G06F 1/1616 |
| 11,467,633 B2* | 10/2022 | Liao | .................. | F16C 11/04 |
| 2015/0124400 A1* | 5/2015 | Huang | .................. | G06F 1/1681 361/679.55 |
| 2020/0267858 A1 | 8/2020 | Kim et al. | | |
| 2021/0271294 A1* | 9/2021 | Liao | .................. | H04M 1/0216 |
| 2022/0308640 A1* | 9/2022 | Liu | .................. | G06F 1/1681 |

FOREIGN PATENT DOCUMENTS

| | | |
|---|---|---|
| CN | 112178041 A | 1/2021 |
| WO | 2020186890 A1 | 9/2020 |
| WO | 2021036677 A1 | 3/2021 |

OTHER PUBLICATIONS

European Search Report in the European application No. 21188119.8, dated Jan. 4, 2022,(8p).

* cited by examiner

*Primary Examiner* — Lisa Lea-Edmonds

(74) *Attorney, Agent, or Firm* — Arch & Lake LLP

(57) ABSTRACT

The disclosure relates to a rotating module and an electronic device. The rotating module includes a support, a rotating member, and an elastic damping member. The rotating member includes a first rotating member and a second rotating member connected to the support respectively. A first end of the damping member is fixed to the support. A second end of the damping member is in contact with the rotating member for providing a damping force for relative rotation of the first rotating member and the second rotating member. The second end is an opposite end of the first end. The support is located between the rotating member and the damping member.

20 Claims, 4 Drawing Sheets

ROTATING MODULE AND ELECTRONIC DEVICE

CROSS-REFERENCE TO RELATED APPLICATION

This application is based upon and claims priority to Chinese Patent Application No. 202110312894.8, filed on Mar. 24, 2021, the entire content of which is incorporated herein by reference for all purposes.

TECHNICAL FIELD

The disclosure relates to the field of electronic devices, and more particularly, to a rotating module and an electronic device.

BACKGROUND

With regard to the current development trend of electronic devices, foldable electronic devices such as screen-foldable mobile phones and screen-foldable computers will be the future development trend. With regard to the foldable electronic devices, rotating modules are very important, and the performance of the rotating modules will directly affect the function and experience of the whole electronic devices. Due to the lack of a damping sense during rotation, the rotating module only has locking functions for an opening position and a closing position. That is, the rotating module can only hover in an unfolded state or in a folded state, and does not have a hovering function in an intermediate state between the unfolded state and the folded state.

SUMMARY

According to a first aspect of examples of the disclosure, a rotating module is provided, which may include: a support; a rotating member, including a first rotating member and a second rotating member, the first rotating member and the second rotating member being connected to the support; and a damping member, a first end of the damping member being fixed to the support, a second end of the damping member being in contact with the rotating member to provide the first rotating member and the second rotating member with a damping force for relative rotation of the first rotating member and the second rotating member, the second end being an opposite end of the first end. The support may be disposed between the rotating member and the damping member.

According to a second aspect of examples of the disclosure, an electronic device is provided, which may include: a rotating module, comprising: a support; a rotating member, comprising a first rotating member and a second rotating member, the first rotating member and the second rotating member being connected to the support; and a damping member, a first end of the damping member being fixed to the support, a second end of the damping member being in contact with the rotating member to provide the first rotating member and the second rotating member with a damping force for relative rotation of the first rotating member and the second rotating member, the second end being an opposite end of the first end; wherein the support is disposed between the rotating member and the damping member; a first shell, mounted on the first rotating member; and a second shell, mounted on the second rotating member.

It should be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate examples consistent with the disclosure and, together with the specification, serve to explain the principles of the disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. In contrast, they are only examples of devices described in details as the attached claims and consistent with some aspects of the disclosure.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

Figure 3:
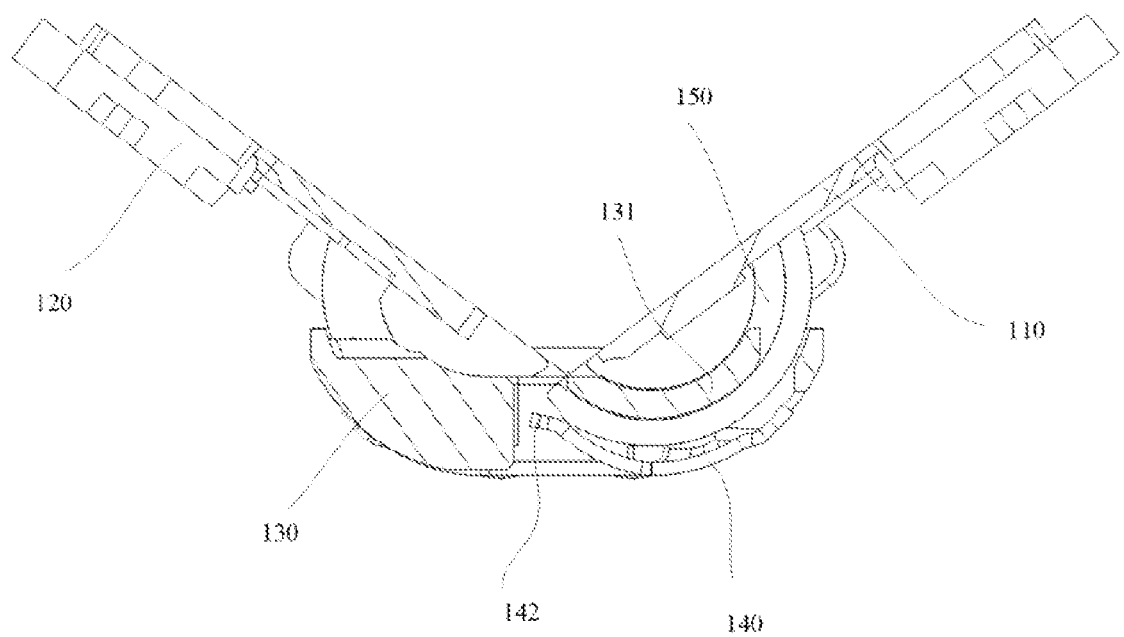
FIG. 3 is a third schematic structure diagram of a rotating module, according to one or more examples of the present disclosure.

In the description of the disclosure, it should be understood that orientation or positional relationships indicated by the terms "center", "upper", "lower", "top", "bottom", "inner", "outer" and the like are orientation or positional relationships illustrated in FIG. 3.

An example of the disclosure provides a rotating module, which includes:

a support 130;

a rotating member, including a first rotating member 110 and a second rotating member 120 connected to the support 130 respectively; and a damping member 140; a first end of the damping member 140 is fixed to the support 130, a second end of the damping member 140 is in contact with the rotating member for providing a damping force for relative rotation of the first rotating member 110 and the second rotating member 120, and the second end is an opposite end of the first end.

The support 130 is located between the rotating member and the damping member 140.

Figure 1:
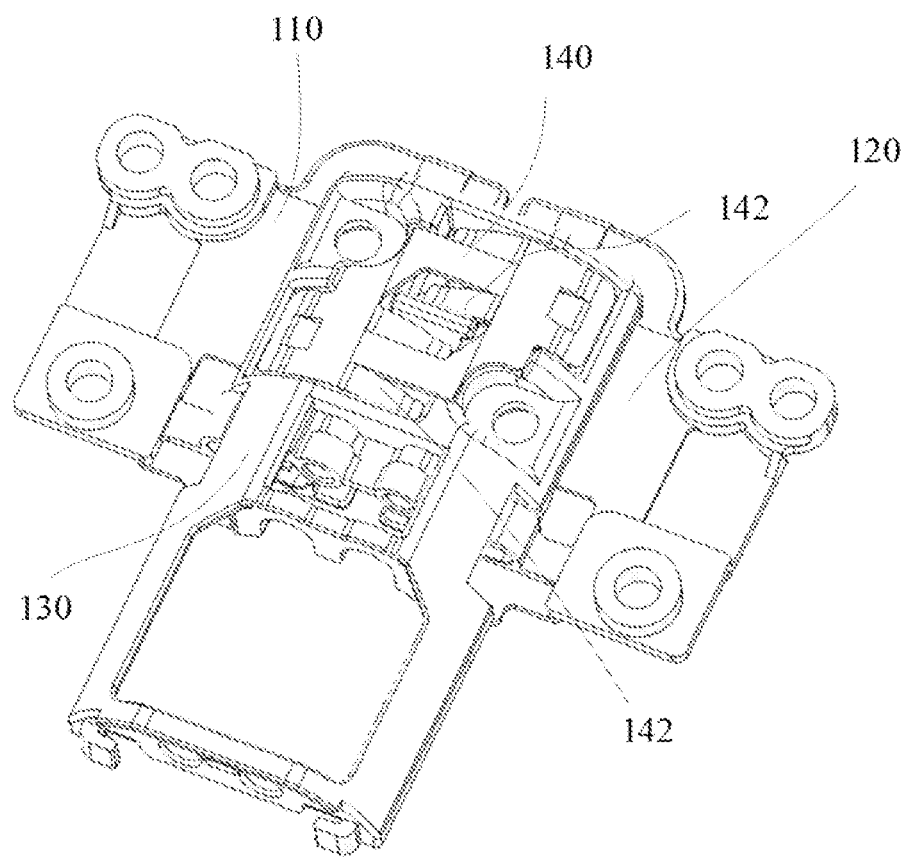
FIG. 1 is a first schematic structure diagram of a rotating module, according to one or more examples of the present disclosure.

As illustrated in FIG. 1, the support 130 is configured to support the rotating member and the damping member 140. Both the first rotating member 110 and the second rotating member 120 are rotatably connected to the support 130. The relative rotation process of the first rotating member 110 and the second rotating member 120 is a process in which the first rotating member 110 rotates relative to the support 130 and/or the second rotating member 120 rotates relative to the support 130. When the first rotating member 110 and the second rotating member 120 rotate towards each other relative to the support 130, an included angle between the first rotating member 110 and the second rotating member 120 gradually decreases until the included angle is approximately 0°. At this moment, the first rotating member 110 and the second rotating member 120 are in a folded state. When the first rotating member 110 and the second rotating member 120 rotate away from each other relative to the support 130, an included angle between the first rotating member 110 and the second rotating member 120 gradually increases until the included angle is approximately 180°. At this moment, the first rotating member 110 and the second rotating member 120 are in an unfolded state.

In some examples, a shaft sleeve is set on one of the rotating member and the support while a shaft core is set on the other one of the rotating member and the support, and the shaft core is coaxial with the shaft sleeve and is embedded in the shaft sleeve. The rotational connection of the first rotating member relative to the support and the rotational connection of the second rotating member relative to the support may be achieved through the cooperation of the shaft core and the shaft sleeve. It will be understood that the rotational connection of the rotating member relative to the support is not limited to the connection of the shaft core and the shaft sleeve.

In the examples of the disclosure, the rotating member is in contact with the damping member, and at least a friction force is generated between the rotating member and the damping member. At least the friction force can serve as a damping force for maintaining the state of the rotating member.

In some examples, the damping member includes an elastic member with elasticity.

Figure 2:
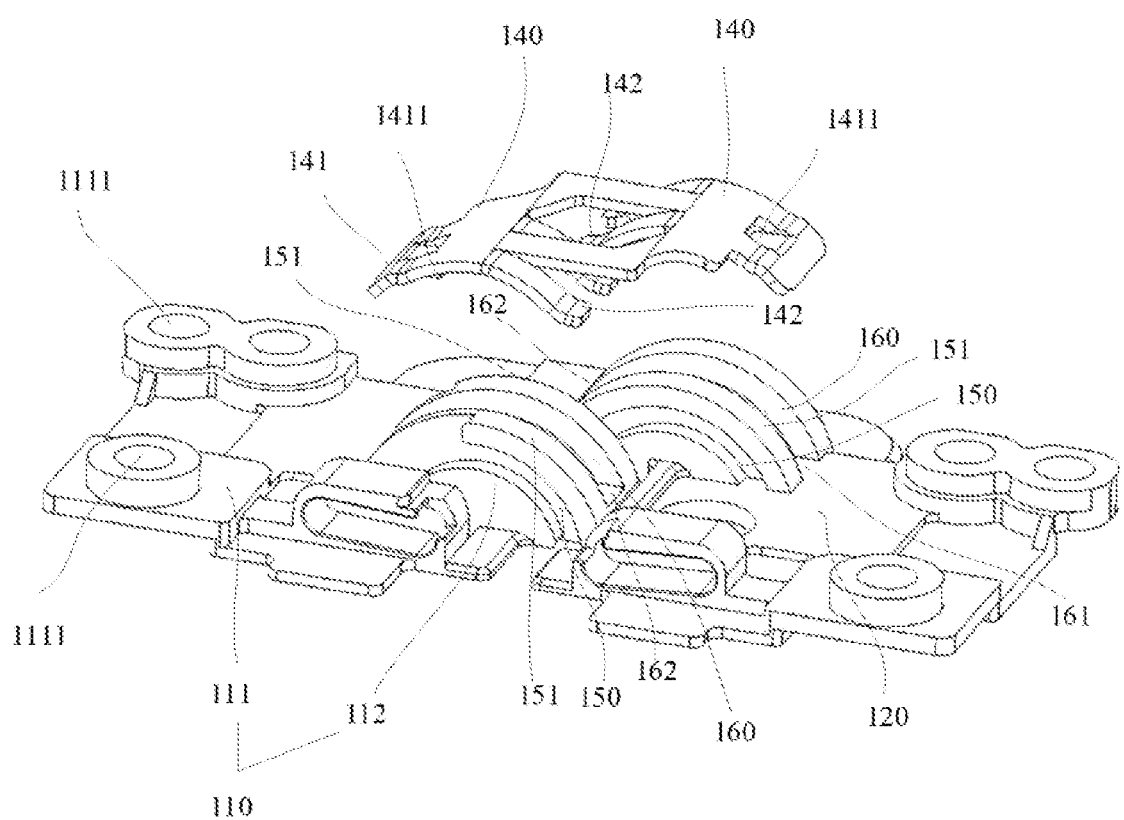
FIG. 2 is a second schematic structure diagram of a rotating module, according to one or more examples of the present disclosure.

As illustrated in FIG. 1 to FIG. 3, the support 130 is not illustrated in FIG. 2. During the relative rotation, force interaction is generated between the first and second rotating members 110, 120 and the damping member 140 to make the damping member 140 deformed in the disclosure. The deformed damping member 140 can generate an elastic force serving as a damping force which can maintain the state of the rotating member, and the first rotating member 110 and the second rotating member 120 may stably hover at more positions during the relative rotation.

In a specific example, both the first rotating member and the second rotating member may rotate between 0° and 90°. When both rotation angles of the first rotating member and the second rotating member are 0°, the first rotating member and the second rotating member are in a folded state. When both the rotation angles of the first rotating member and the second rotating member are 90°, the first rotating member and the second rotating member are in an unfolded state. According to the rotating module provided by the examples of the disclosure, the first rotating member and the second rotating member may stay at any angle between 0° and 90° respectively by utilizing the damping force provided by the damping member. For example, the first rotating member and/or the second rotating member may stay at an angle of 30°, 50°, or 60° and the like without depending on any support structure.

In some examples, the damping member is in a compressive deformation state or a stretching deformation state when the first rotating member and the second rotating member are between the unfolded state and the folded state. That is, the interaction between the rotating member and the damping member may include: the rotating member compresses the damping member, or the rotating member stretches the damping member.

The damping member includes, but is not limited to, an elastic member with elasticity such as a spring, an elastic piece or the like. The spring may be a compression spring or a tension spring. Compared with the spring, the elastic piece occupies less space and is more suitable for being used in limited space in an electronic device.

Non-restrictively, the contact of the second end of the damping member with the rotating member includes: the second end of the damping member abuts against the rotating member or is fixedly connected to the rotating member. For example, when the damping member is a compression spring or an elastic piece, the rotating member may abut against the damping member. For example, when the damping member is a tension spring, the second end of the tension spring needs to be fixed to the rotating member in order to stretch the tension spring during rotation.

In a specific example, the second end of the damping member abuts against the rotating member, and the second end of the damping member is in sliding contact with the rotating member during the rotation of the rotating member relative to the support. The sliding contact ensures the continuity of the damping force provided by the damping member, the sliding friction force generated in the sliding process may further increase the damping force, the damping sense in the use process of the electronic device is improved, the hovering effect is further ensured, and the user experience is optimized.

In a specific example, as illustrated in FIG. 1 and FIG. 3, the damping member 140 is located within the range of the support 130. That is, an outer surface of the damping member 140 is smoothly transited to an outer surface of the support 130. The damping member 140 is within an orthographic projection range of the support 130, and the damping member 140 does not extend out of the outer surface of the support 130. This structural feature reduces the occupied space of the damping member 140 and improves the integrity of the damping member 140 and the support 130.

There are at least two damping members 140. FIG. 2 schematically shows two damping members 140. The two damping members 140 are in contact with the first rotating member 110 and the second rotating member 120 respectively.

The first end of the damping member is fixed to the support, so that the positional stability of the damping member can be maintained, and the movement or displacement of the damping member in the use process of the rotating module is reduced. Non-restrictively, the damping member may be fixed by welding, or by fasteners such as screws passing through the damping member and the support respectively.

In some examples, the rotating module further includes a shell which covers the support and the damping member, and serves as the outer surface of the rotating module. Dust and the like in an external environment can be prevented from entering the rotating module, the damping member can be further limited between the support and the shell, and the connection of the damping member and the support is further strengthened.

According to the examples of the disclosure, the damping force is provided by utilizing the elasticity of the damping member, so that a larger damping force can be obtained, and the requirement of a large-screen electronic device can be met. Moreover, damping forces with different magnitudes can be obtained flexibly and conveniently by adjusting the magnitude of the elastic force. Furthermore, when the friction force serves as the damping force, a plurality of parts are required for cooperation, and the occupied space of the rotating module may be increased due to the addition of the parts. In the examples of the disclosure, only the damping member and the rotating member need to cooperate, so that the number of parts in the rotating module is reduced, and the occupied space of the rotating module is favorably reduced.

In other alternative examples, the second end of the damping member 140 includes: at least one elastic arm 142 protruding towards the rotating member; and the elastic arm 142 is in contact with the first rotating member 110 and/or the second rotating member 120.

The plurality of elastic arms 142 facilitate improvement of the damping force and further meet the hovering requirements of a large-screen electronic device.

FIG. 2 schematically shows two elastic arms 142 on each damping member 140, and the elastic arms 142 are spaced apart. It will be understood that the damping member 140 in contact with the first rotating member 110 and the damping member 140 in contact with the second rotating member 120 may or may not have the same number of elastic arms 142. However, the same elastic arms 142 on the plurality of damping members 140 can provide more uniform damping forces, so that the damping sense of the first rotating member 110 in the rotating process is similar to the damping sense of the second rotating member 120 in the rotating process, and the use sense of a user is improved.

In a specific example, the damping member is an elastic piece, and the magnitude of the damping force may be adjusted by adjusting the bending degree of the elastic arm. For example, with regard to damping members of the same material and the same specification, as the degree of the elastic arm bending towards the rotating member is larger, the elastic arm may generally provide a larger elastic damping force, and vice versa.

In other alternative examples, the elastic arm 142 in contact with the first rotating member 110 and the elastic arm 142 in contact with the second rotating member 120 are oriented towards a central position of the support 130.

As illustrated in FIG. 2 and FIG. 3, the second end of the damping member 140 is close to the central position of the support 130, and the first end of the damping member 140 is close to an edge position of the support 130. The elastic arm 142 is close to the central position of the support 130, the deformation process of the elastic arm 142 may not extend beyond the support 130, the inner space of the support 130 is fully utilized, the structure is more compact, and the size of the rotating module is reduced. Moreover, in practical use, the part of the rotating piece far away from the support 130 also needs to be connected to components such as an electronic device shell 200, the elastic arm 142 is close to the central position of the support 130, and the influence of the electronic device shell 200 on the elastic arm 142 is reduced.

In other alternative examples, the damping member 140 in contact with the first rotating member 110 and the damping member 140 in contact with the second rotating member 120 are of an integrated structure.

The integrated structure can increase the strength of the damping member and is also convenient to mount. By taking two damping members as illustrated in FIG. 2 as an example, when the integrated structure is mounted, the contact between two rotating members and damping members is achieved by using one mounting step, and the two damping members do not need to be mounted respectively by using two steps, so that the mounting steps are saved, and the assembly efficiency can be improved.

It will be understood that a plurality of damping members may also be of separate structures independent of each other.

In other alternative examples, a track groove 160 is set on the first rotating member 110 and the second rotating member 120 respectively.

The first end of the damping member 140 is at least partially embedded in the track groove 160 and is in contact with the rotating member in the track groove 160.

As illustrated in FIG. 2, the damping member 140 has a convex portion 1411 protruding towards the track groove 160. The convex portion 1411 is embedded in the track groove 160 and is in contact with the rotating member in the track groove 160. The convex portion 1411 of the damping member 140 is in contact with the track groove 160 on the rotating member, which is advantageous for increasing the friction force between the damping member 140 and the support 130 of the rotating member, and improving the damping force during the rotation of the rotating member. Moreover, the track groove 160 is formed by grooving the rotating member, which is also advantageous for reducing the weight of the rotating member. Embedding the convex portion into the track groove 160 can further increase the compactness of the assembly of the damping member 140 with the rotating member.

The track groove 160 plays a guiding role in the sliding of the damping member 140 relative to the rotating member and improves the stationarity and smoothness of the sliding process. Embedding the convex portion 1411 into the track groove 160 can also further limit separation of the damping member 140 from the rotating member.

In other alternative examples, the track groove 160 includes a first groove wall 161 and a second groove wall 162. A movement track of the track groove 160 is formed between the second groove wall 162 and the first groove wall 161.

The first rotating member 110 and the second rotating member 120 are unfolded, and the part, embedded in the track groove 160, of the first end of the damping member 140 abuts against the first groove wall 161 of the track groove 160.

The first rotating member 110 and the second rotating member 120 are folded, the part, embedded in the track groove 160, of the first end of the damping member 140 abuts against the second groove wall 162 of the track groove 160, and the first groove wall 161 and the second groove wall 162 are oppositely arranged.

The convex portion cooperates with the groove wall of the track groove to limit the rotating process of the rotating member.

The rotation angle of the rotating member is defined to be minimum in a folded state, and the rotation angle of the rotating member is defined to be maximum in an unfolded state. By abutment of the damping member 140 against the groove wall of the track groove 160, a user will also perceive that the rotating member has been in a limit/maximum unfolded state.

In some examples, as illustrated in FIG. 2 and FIG. 3, when the first rotating member 110 and the second rotating member 120 rotate from the folded state to the unfolded state, the convex portion 1411 moves within the track groove 160. Usually, the track groove 160 is substantially arc-shaped in order to cooperate with the rotation process. When the convex portion 1411 abuts against the first groove wall 161 of the track groove 160, the convex portion 1411 prevents the rotating member from continuing to rotate, and the rotating member stays due to the limit of the convex portion 1411. The first groove wall 161 of the track groove 160 may be configured to define a maximum angle at which the rotating member can rotate. When the first rotating member 110 and the second rotating member 120 rotate from the unfolded state to the folded state, the second groove wall 162 of the track groove 160 may be configured to define a minimum angle at which the rotating member can rotate.

In other alternative examples, both the first rotating member 110 and the second rotating member 120 include: a first portion 112 and a second portion 111. The first portion 112 protrudes towards the support 130 and includes a sliding groove 150, the sliding groove 150 is arc-shaped, and a groove wall outer surface 151 of the sliding groove 150 is in contact with the second end of the damping member 140. The second portion 111 is connected to the first portion 112 and includes a mounting position 1111, the mounting position 1111 is configured to mount a shell 200 of an electronic device.

The support 130 includes a sliding rail 131. The sliding rail 131 has an arc-shaped cross section. The sliding rail 131 is embedded in the sliding groove 150 and movable in the sliding groove 150 along an arrangement direction of the sliding groove 150.

As illustrated in FIG. 1 to FIG. 3, during the rotation of the rotating member, the sliding rail 131 slides in the sliding groove 150. Since the sliding groove 150 is arc-shaped, a rotating track of the rotating member is also arc-shaped.

When the first rotating member and the second rotating member rotate relatively, the sliding rail slides in the sliding groove, the second end of the damping member may simultaneously slide along the groove wall of the sliding groove, and a continuous damping force is provided for the rotating process. The damping member not only generates a damping force through elastic deformation, but also generates a sliding friction force when sliding relative to the rotating member. The sliding friction force also provides the damping force for the relative rotation process of the first rotating member and the second rotating member.

Non-restrictively, the mounting position includes a mounting hole for passage of a fastener such as a screw and the like. The fastener such as the screw and the like is configured to fix the shell 200 of the electronic device and the second portion.

In some examples, the track groove is located on the first portion, and the shape of the track groove may be the same as the shape of the sliding groove. When the rotating member rotates, the sliding rail slides in the sliding groove, and meanwhile, the convex portion of the damping member also slides along the track groove.

In other alternative examples, the groove wall outer surface 151 of the sliding groove 150 is an arc surface.

As illustrated in FIG. 2 and FIG. 3, the radius of curvature of the arc-shaped groove wall outer surface 151 is equal at each position, the damping force provided by the damping member 140 is equal during the relative rotation of the first rotating member 110 and the second rotating member 120, and the stable damping force is advantageous for improving the user experience.

In other alternative examples, both a first surface and a second surface of the first portion 112 include the sliding groove 150. The second surface is an opposite surface of the first surface.

As illustrated in FIG. 2, two opposite surfaces of the first portion 112 are both connected to the sliding rail 131 of the support 130 through the sliding groove 150, so that the contact area of the rotating member and the support 130 is increased, and the stability of the rotating process can be improved.

In a specific example, as illustrated in FIG. 2, the first portion 112 has a semicircular cross section. The first surface and the second surface refer to two opposite end surfaces of the first portion 112, respectively. A track groove 160 is provided on a circumferential surface of the first portion 112, and a surface of the circumferential surface of the first portion 112 other than the track groove 160 is in contact with the damping member 140.

Figure 4:
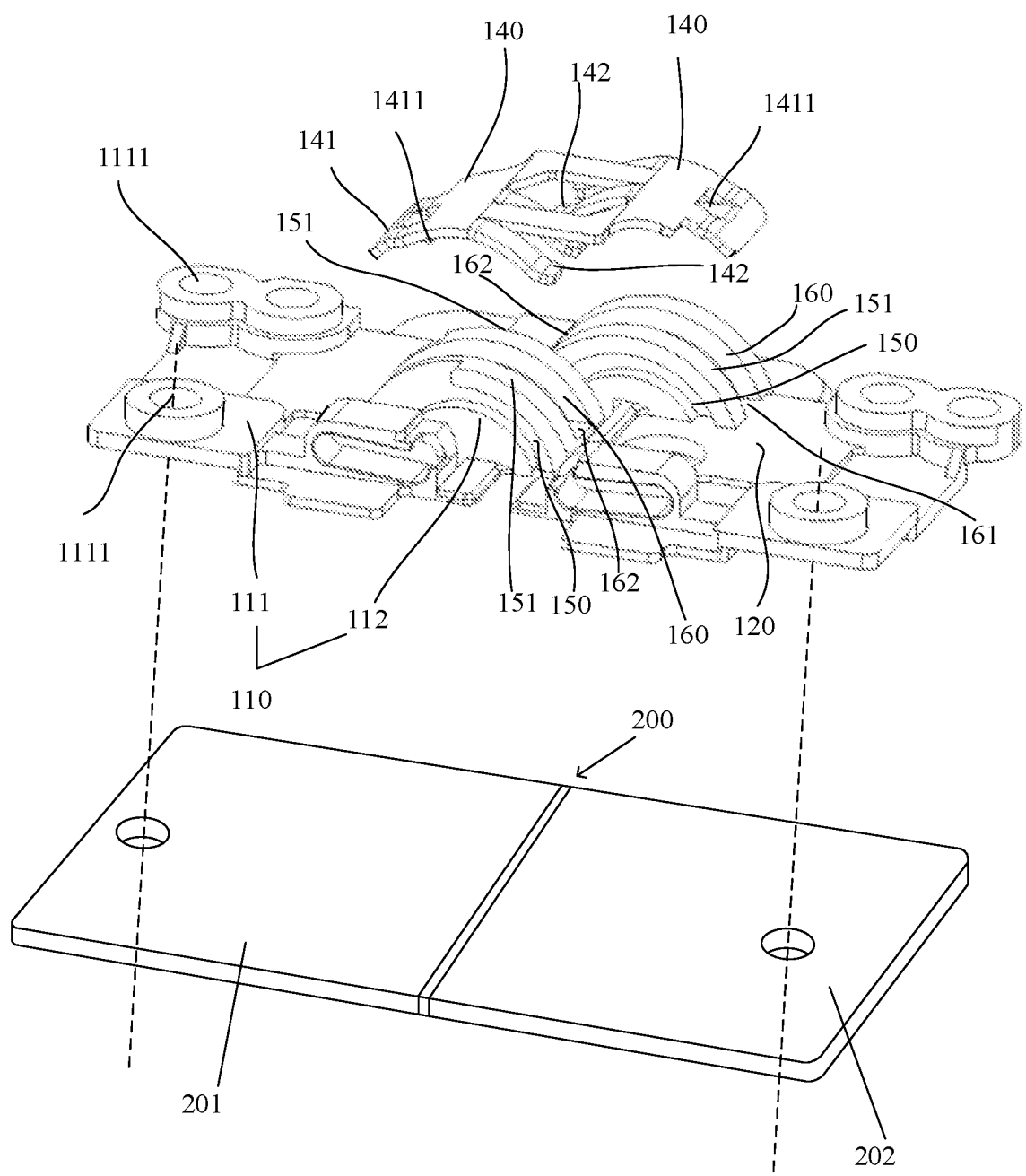
FIG. 4 is a schematic structure diagram of a rotating module and a shell of an electronic device, according to one or more examples of the present disclosure.

As illustrated in FIG. 4, an example of the disclosure provides an electronic device, which includes: the rotating module described in any one of the above examples; a first shell 201, mounted on the first rotating member 110; and a second shell 202, mounted on the second rotating member 120.

In the examples of the disclosure, there may be one or at least two rotating modules. The plurality of rotating modules are distributed in parallel in folding regions of the first shell 201 and the second shell 202.

Generally, the electronic device refers to a foldable or unfoldable device, including, but not limited to, a mobile phone, a laptop, or the like.

The relative positional relationship between the first shell 201 and the second shell 202 is the same as the relative positional relationship between the first rotating member and the second rotating member. For example, when the first rotating member and the second rotating member are in an unfolded state, the first shell 201 and the second shell 202 are also in an unfolded state. When the first rotating member and the second rotating member are in a folded state, the first shell 201 and the second shell 202 are also in a folded state.

In some examples, the electronic device further includes: a foldable screen. A back surface of the foldable screen covers the first shell 201, the second shell 202, and the rotating module. The foldable screen and the support are located on two opposite surfaces of the rotating member respectively. When the first rotating member and the second rotating member rotate relatively, the first shell 201 and the second shell 202 are driven to rotate relatively, and the foldable screen rotates along with the relative rotation of the first shell 201 and the second shell 202.

In practical application, since the damping member may provide a large damping force, a large screen for the electronic device not only means that the size of the foldable screen is large enough, but also the corresponding sizes of the first shell 201 and the second shell 202 are large, so that the weights borne by the first rotating member and the second rotating member respectively are large. The damping force in the examples of the disclosure may provide a sufficient damping force to meet the hovering function of the large-screen electronic device.

In a specific example, as illustrated in FIG. 1 to FIG. 3, the electronic device is a mobile phone. A left rotating member (also referred to as the second rotating member 120) and a right rotating member (also referred to as the first rotating member 110) are disposed on the support 130. The support 130 has a semicircular sliding rail 131 thereon. The left rotating member has a semicircular sliding groove 150 thereon. The right rotating member also has the identical sliding groove 150. Therefore, left and right rotating blocks/members may freely rotate on the support 130. An elastic piece is disposed on the support 130 and is fixed to the support 130. The elastic piece is an elastic material. The elastic piece has an elastic arm 142 thereon. The elastic arm 142 is in contact with an upper cylindrical surface of the rotating member (i.e., a groove wall outer surface 151 of the sliding groove 150). When the elastic piece is fixed to the support 130, the elastic arm 142 is compressed to elastically deform, thereby generating pressure and a damping force. The solution is more efficient in production and manufacture, low in cost, less in occupied space, and simple to assemble. The solution also has a more stable and continuous damping force, can adapt to larger screens, and can generate better user experience.

The features disclosed in the several product examples provided by the disclosure may be combined arbitrarily without conflict so as to obtain new product examples.

After considering the specification and implementing the disclosure disclosed here, other implementation solutions of the disclosure would readily be conceivable to a person skilled in the art. The disclosure is intended to cover any variations, uses, or adaptations of the disclosure following the general principles thereof and including such departures from the disclosure as come within known or customary practice in the art. The specification and examples are only regarded as exemplary, and the true scope and spirit of the disclosure are indicated by the claims.

It should be understood that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A rotating module, comprising:
   a support;
   a rotating member, comprising a first rotating member and a second rotating member, the first rotating member and the second rotating member being connected to the support; and
   a damping member, a first end of the damping member being fixed to the support, a second end of the damping member being in contact with the rotating member to provide the first rotating member and the second rotating member with a damping force for relative rotation of the first rotating member and the second rotating member, the second end being an opposite end of the first end;
   wherein the support is disposed between the rotating member and the damping member.

2. The rotating module of claim 1, wherein the second end of the damping member comprises:
   at least one elastic arm, protruding towards the rotating member, the at least one elastic arm being in contact with at least one of the first rotating member or the second rotating member.

3. The rotating module of claim 2, wherein the elastic arm in contact with the first rotating member and the elastic arm in contact with the second rotating member are oriented towards a central position of the support.

4. The rotating module of claim 1, wherein the damping member in contact with the first rotating member and the damping member in contact with the second rotating member are of an integrated structure.

5. The rotating module of claim 1, wherein a track groove is set on the first rotating member and the second rotating member; and
   the first end of the damping member is at least partially embedded in the track groove, and is in contact with the rotating member in the track groove.

6. The rotating module of claim 5, wherein the track groove comprises: a first groove wall and a second groove wall; a movement track of the track groove is formed between the second groove wall and the first groove wall;
   the first rotating member and the second rotating member are unfolded, and a part of the first end of the damping member is embedded in the track groove and abuts against the first groove wall of the track groove; and
   the first rotating member and the second rotating member are folded, a part of the first end of the damping member is embedded in the track groove and abuts against the second groove wall of the track groove, and the first groove wall and the second groove wall are oppositely disposed.

7. The rotating module of claim 1, wherein both of the first rotating member and the second rotating member comprise:
   a first portion, protruding towards the support and comprising an arc-shaped sliding groove, a groove wall outer surface of the sliding groove being in contact with the second end of the damping member; and
   a second portion, connected to the first portion and comprising a mounting position for mounting a shell of an electronic device;
   wherein the support comprises a sliding rail with an arc-shaped cross section, the sliding rail is embedded in the sliding groove and is movable in the sliding groove along an arrangement direction of the sliding groove.

8. The rotating module of claim 7, wherein the groove wall outer surface of the sliding groove is an arc surface.

9. The rotating module of claim 7, wherein both of a first surface and a second surface of the first portion comprise the sliding groove, and the second surface is an opposite surface to the first surface.

10. The rotating module of claim 5, wherein both of the first rotating member and the second rotating member comprise:
    a first portion, protruding towards the support and comprising an arc-shaped sliding groove, a groove wall outer surface of the sliding groove being in contact with the second end of the damping member; and a second portion, connected to the first portion and comprising a mounting position for mounting a shell of an electronic device;

wherein the support comprises a sliding rail with an arc-shaped cross section, the sliding rail is embedded in the sliding groove and is movable in the sliding groove along an arrangement direction of the sliding groove.

11. An electronic device, comprising:
a rotating module, comprising:
  a support;
  a rotating member, comprising a first rotating member and a second rotating member, the first rotating member and the second rotating member being connected to the support; and
  a damping member, a first end of the damping member being fixed to the support, a second end of the damping member being in contact with the rotating member to provide the first rotating member and the second rotating member with a damping force for relative rotation of the first rotating member and the second rotating member, the second end being an opposite end of the first end;
  wherein the support is disposed between the rotating member and the damping member;
a first shell, mounted on the first rotating member; and
a second shell, mounted on the second rotating member.

12. The electronic device of claim 11, wherein the second end of the damping member comprises:
  at least one elastic arm, protruding towards the rotating member, the at least one elastic arm being in contact with at least one of the first rotating member or the second rotating member.

13. The electronic device of claim 12, wherein the elastic arm in contact with the first rotating member and the elastic arm in contact with the second rotating member are oriented towards a central position of the support.

14. The electronic device of claim 11, wherein the damping member in contact with the first rotating member and the damping member in contact with the second rotating member are of an integrated structure.

15. The electronic device of claim 11, wherein a track groove is set on the first rotating member and the second rotating member; and
  the first end of the damping member is at least partially embedded in the track groove and is in contact with the rotating member in the track groove.

16. The electronic device of claim 15, wherein the track groove comprises: a first groove wall and a second groove wall; a movement track of the track groove is formed between the second groove wall and the first groove wall;
  the first rotating member and the second rotating member are unfolded, and a part of the first end of the damping member is embedded in the track groove and abuts against the first groove wall of the track groove; and
  the first rotating member and the second rotating member are folded, a part of the first end of the damping member is embedded in the track groove and abuts against the second groove wall of the track groove, and the first groove wall and the second groove wall are oppositely disposed.

17. The electronic device of claim 11, wherein both of the first rotating member and the second rotating member comprise:
  a first portion, protruding towards the support and comprising an arc-shaped sliding groove, a groove wall outer surface of the sliding groove being in contact with the second end of the damping member; and
  a second portion, connected to the first portion and comprising a mounting position for mounting a shell of an electronic device;
  wherein the support comprises a sliding rail with an arc-shaped cross section, the sliding rail is embedded in the sliding groove and is movable in the sliding groove along an arrangement direction of the sliding groove.

18. The electronic device of claim 17, wherein the groove wall outer surface of the sliding groove is an arc surface.

19. The electronic device of claim 17, wherein both of a first surface and a second surface of the first portion comprise the sliding groove, and the second surface is an opposite surface to the first surface.

20. The electronic device of claim 15, wherein both of the first rotating member and the second rotating member comprise:
  a first portion, protruding towards the support and comprising an arc-shaped sliding groove, a groove wall outer surface of the sliding groove being in contact with the second end of the damping member; and
  a second portion, connected to the first portion and comprising a mounting position for mounting a shell of an electronic device;
  wherein the support comprises a sliding rail with an arc-shaped cross section, the sliding rail is embedded in the sliding groove and is movable in the sliding groove along an arrangement direction of the sliding groove.

* * * * *